(12) United States Patent
Benabid et al.

(10) Patent No.: US 12,338,162 B2
(45) Date of Patent: Jun. 24, 2025

(54) METHOD AND DEVICE FOR MANUFACTURING A HOLLOW-CORE OPTICAL FIBRE

(71) Applicants: UNIVERSITE DE LIMOGES, Limoges (FR); CENTRE NATIONAL DE LA RECHERCHE SCIENTIFIQUE, Paris (FR)

(72) Inventors: Fetah Benabid, Le Palais-sur-Vienne (FR); Frédéric Gerome, Limoges (FR); Foued Armani, Limoges (FR); Frédéric Delahaye, Limoges (FR); Benoît Debord, Limoges (FR)

(73) Assignees: UNIVERSITE DE LIMOGES, Limoges (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 258 days.

(21) Appl. No.: 17/593,258

(22) PCT Filed: Mar. 5, 2020

(86) PCT No.: PCT/EP2020/055913
§ 371 (c)(1),
(2) Date: Sep. 14, 2021

(87) PCT Pub. No.: WO2020/187594
PCT Pub. Date: Sep. 24, 2020

(65) Prior Publication Data
US 2022/0153625 A1 May 19, 2022

(30) Foreign Application Priority Data
Mar. 15, 2019 (FR) ........................................ 1902655

(51) Int. Cl.
*C03B 37/025* (2006.01)
*C03B 37/029* (2006.01)

(52) U.S. Cl.
CPC ........ *C03B 37/0256* (2013.01); *C03B 37/029* (2013.01); *C03B 2203/16* (2013.01); *C03B 2205/68* (2013.01)

(58) Field of Classification Search
None
See application file for complete search history.

(56) References Cited

U.S. PATENT DOCUMENTS

2003/0230118 A1* 12/2003 Dawes ................ C03B 37/0122
65/393
2005/0089288 A1 4/2005 Saito
(Continued)

FOREIGN PATENT DOCUMENTS

WO 2005012197 A2 2/2005

OTHER PUBLICATIONS

First Office Action and Search Report received for Chinese Application No. 202080021172.0, mailed Jan. 9, 2023.
(Continued)

*Primary Examiner* — Lisa L Herring
(74) *Attorney, Agent, or Firm* — Greer, Burns & Crain, Ltd

(57) ABSTRACT

A method for manufacturing an optical fibre, in which a preform is inserted into a furnace; the preform is drawn via an outlet of the furnace; and the drawn preform has a working area including a structure composed of walls, and gas streams are applied to the two opposite faces of these walls, which streams run along the walls in opposite directions, so as to subject the walls to a shear force of gas streams counter-propagating on either side of the walls. A device for manufacturing an optical fibre is also provided.

13 Claims, 3 Drawing Sheets

(56) References Cited

U.S. PATENT DOCUMENTS

| | | | |
|---|---|---|---|
| 2009/0126407 A1* | 5/2009 | Bookbinder | C03B 37/01861 |
| | | | 65/391 |
| 2009/0202211 A1* | 8/2009 | Bickham | G02B 6/02357 |
| | | | 65/401 |
| 2009/0245729 A1 | 10/2009 | Dong et al. | |
| 2010/0303429 A1 | 12/2010 | Gibson et al. | |
| 2018/0267235 A1* | 9/2018 | Russell | C03B 37/02781 |
| 2020/0079680 A1* | 3/2020 | Corrado | G02B 6/032 |
| 2020/0115270 A1* | 4/2020 | Yoo | G02B 6/02361 |

OTHER PUBLICATIONS

French Search Report received for Application No. 1902655, dated Nov. 18, 2019.
International Search Report and Written Opinion received for PCT/EP2020/055913, mailed May 15, 2020.
Bresson, B., et al., "Anisotropic super-attenuation of capillary waves on driven glass interfaces," Cornell University Library, ARXIV: 1706.03832v1, 2017, 5 pages.

\* cited by examiner

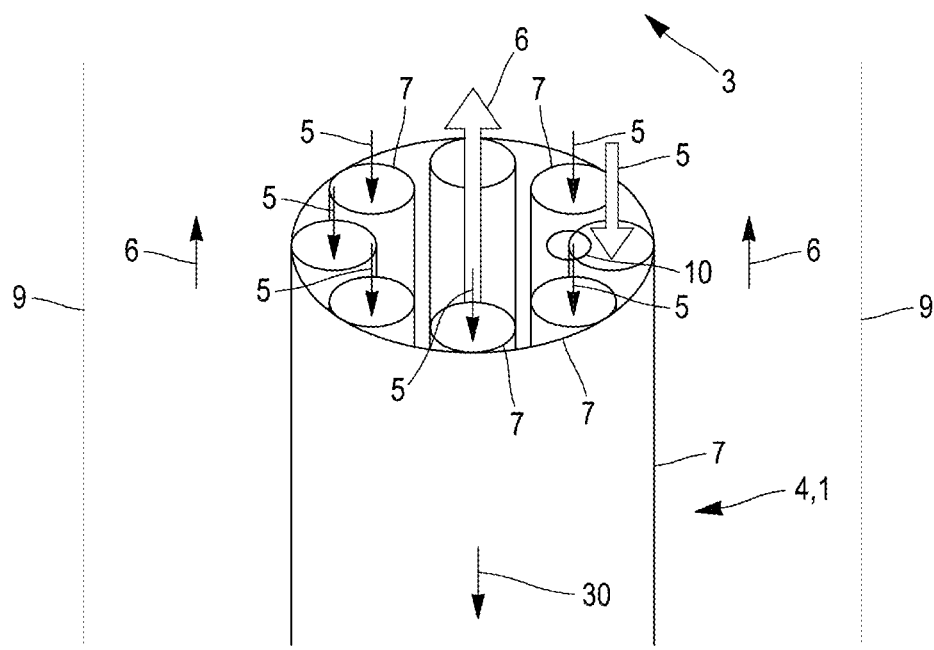
FIG. 3
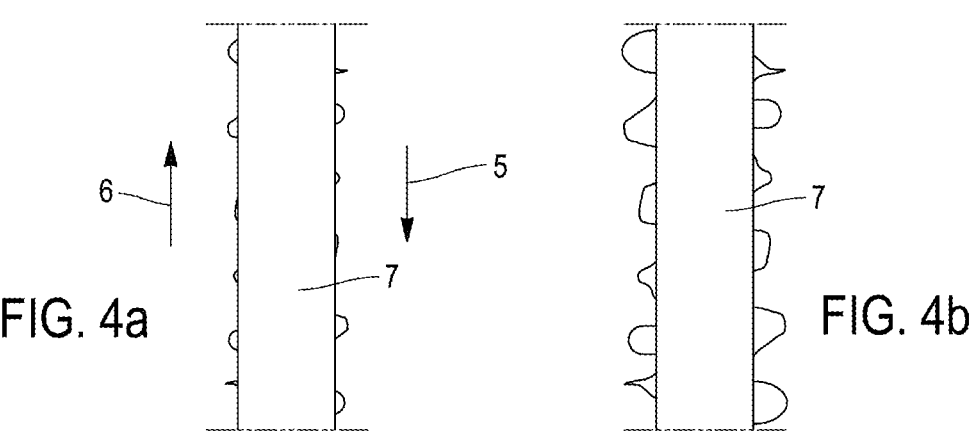
FIG. 4a  FIG. 4b
FIG. 4

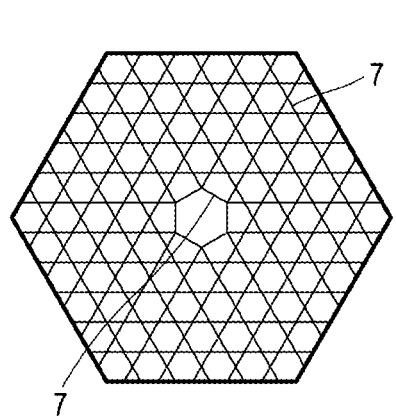
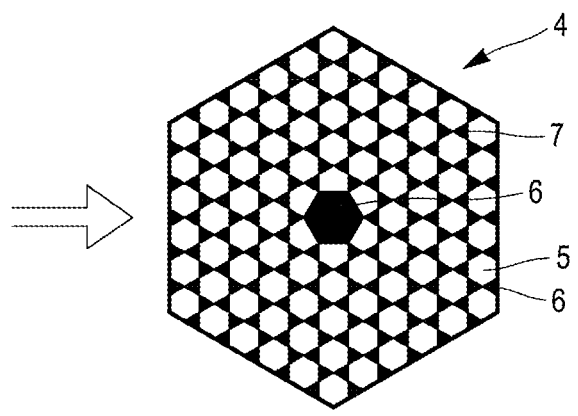
FIG. 5a  FIG. 5b
FIG. 5
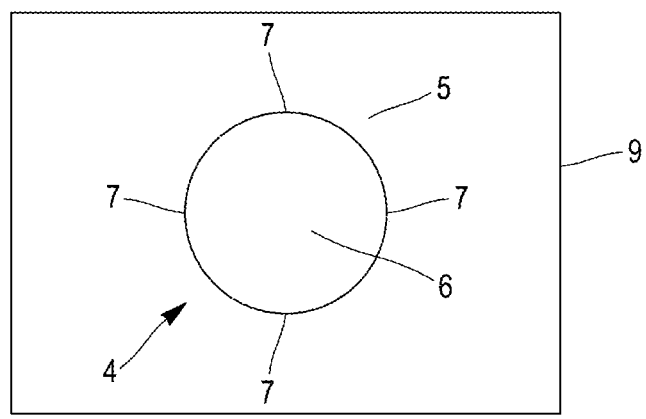
FIG. 6

METHOD AND DEVICE FOR MANUFACTURING A HOLLOW-CORE OPTICAL FIBRE

BACKGROUND

The present invention relates to a method for manufacturing an optical fibre. It also relates to a device for manufacturing an optical fibre.

Today, the limit of the transmission performance of optical fibres is set by dispersion losses.

Hollow-core optical fibre has experienced phenomenal growth since its inception almost 20 years ago. This progress is based on the manufacturing techniques and transmission performance thereof, as well as the applications that have emerged following production thereof, encompassing diverse and varied fields such as telecommunications, non-linear optics, lasers, micromachining, the physics of cold atoms or high-resolution spectroscopy and sensors.

In this context, the state of the art of the transmission losses is approximately 2 to 10 dB/km for hollow fibres according to the type of fibre and the spectral range.

The aim of the present invention is to propose a method and a device for manufacturing a hollow optical fibre, improving the transmission performance of said fibres and/or having reduced losses with respect to the current state of the art.

SUMMARY

This objective is achieved with a method for manufacturing an optical fibre, in which:
 a preform is inserted into a furnace,
 the preform is drawn via an outlet of the furnace, and
 the preform thus drawn comprising a working zone comprising a structure composed of walls, the two opposite faces of these walls being subjected to gas flows following these walls but in opposite directions so as to subject these walls to a shear force of counter-propagating gas flows on either side of these walls.

The walls preferably have a thickness less than 10 µm, preferably less than 3 µm, preferably less than 10 nm.

The preform is preferably inserted through an inlet of the furnace. The gas flows following the walls are preferably created by:
 creating a gas flow called outlet gas flow, propagating from the inlet to the outlet of the furnace, and
 creating a gas flow called inlet gas flow, propagating from the outlet to the inlet of the furnace.

The outlet flow and the inlet flow are preferably created by over-pressure and under-pressure means creating in the preform on the side of the inlet a pressure difference between the outlet flow and the inlet flow, preferably of at least 100 Pa, preferably of at least 1 kPa.

The outlet gas flow and/or the inlet gas flow is preferably created in different distinct zones of the working zone.

The gas flows are preferably created by means situated on the side of an inlet of the furnace through which the preform is inserted.

The gas of the gas flows preferably comprises air and/or an inert gas.

The working zone preferably forms a hollow optical fibre.

The working zone preferably forms an optical fibre of the micro-structured type.

The preform is preferably a glass preform.

The working zone is preferably situated outside the furnace.

The working zone is preferably at a temperature above a softening or vitreous transition temperature of the material composing the preform, and/or at a temperature above 1000° C., preferably above 1500° C.

According to yet another aspect of the invention, a device is proposed for manufacturing an optical fibre, comprising:
 a furnace
 an inlet arranged for inserting a preform into the furnace,
 means for drawing the preform via an outlet of the furnace, and
 means arranged for subjecting the two opposite faces of walls composing a structure of a working zone of the drawn preform to gas flows following these walls but in opposite directions so as to subject these walls to a shear force of counter-propagating gas flows on either side of these walls.

The means arranged for subjecting the drawn preform to gas flows in opposite directions preferably comprise:
 means for creating a gas flow called outlet gas flow, propagating from the inlet to the outlet of the furnace, and
 means for creating a gas flow called inlet gas flow, propagating from the outlet to the inlet of the furnace.

The means for creating the outlet flow and the means for creating the inlet flow preferably comprise over-pressure and under-pressure means arranged for creating in the preform on the side of the inlet a pressure difference between the outlet flow and the inlet flow, preferably of at least 100 Pa, preferably at least 1 kPa.

The means for creating the outlet flow and the means for creating the inlet flow are preferably arranged to create the outlet gas flow and/or the inlet gas flow in different distinct zones of the working zone.

The means arranged for subjecting the drawn preform to gas flows in opposite directions are preferably situated on the side of the inlet of the furnace.

The gas of the gas flows preferably comprises air and/or an inert gas.

The working zone is preferably situated outside the furnace.

The furnace is preferably arranged so that the working zone is at a temperature above a softening or vitreous transition temperature of the material composing the preform, and/or at a temperature above 1000° C., preferably above 1500° C.

According to yet another aspect of the invention, an optical fibre is proposed obtained by a method according to the invention or by a device according to the invention (based on the preform).

BRIEF DESCRIPTION OF THE DRAWINGS

Other advantages and features of the invention will become apparent on reading the detailed description of implementations and embodiments that are in no way limitative, and from the following attached drawings:

FIG. 3 is a diagrammatic perspective view of the preform 1 at the level of the working zone 4, FIG. 4 is an enlargement of the part 10 in FIG. 3 and is a diagrammatic profile view in cross section of a wall 7 of the preform 1 at the level of the working zone 4 with (FIG. 4a) and without (FIG. 4b) implementation of a method according to the invention, FIG. 5 is a cross section top view of the preform 1 at the level of the working zone 4 with (FIG. 5b) and without (FIG. 5a) implementation of another variant of the method according to the invention, and FIG. 6 is a cross section top view of the preform 1 at the level of the working zone 4 in another variant of the method according to the invention.

DETAILED DESCRIPTION

As these embodiments are in no way limitative, variants of the invention can be considered in particular comprising only a selection of the characteristics described or illustrated hereinafter, in isolation from the other characteristics described or illustrated (even if this selection is isolated within a phrase comprising these other characteristics), if this selection of characteristics is sufficient to confer a technical advantage or to differentiate the invention with respect to the state of the prior art. This selection comprises at least one, preferably functional, characteristic without structural details, and/or with only a part of the structural details if this part alone is sufficient to confer a technical advantage or to differentiate the invention with respect to the state of the prior art.

Figure 1:
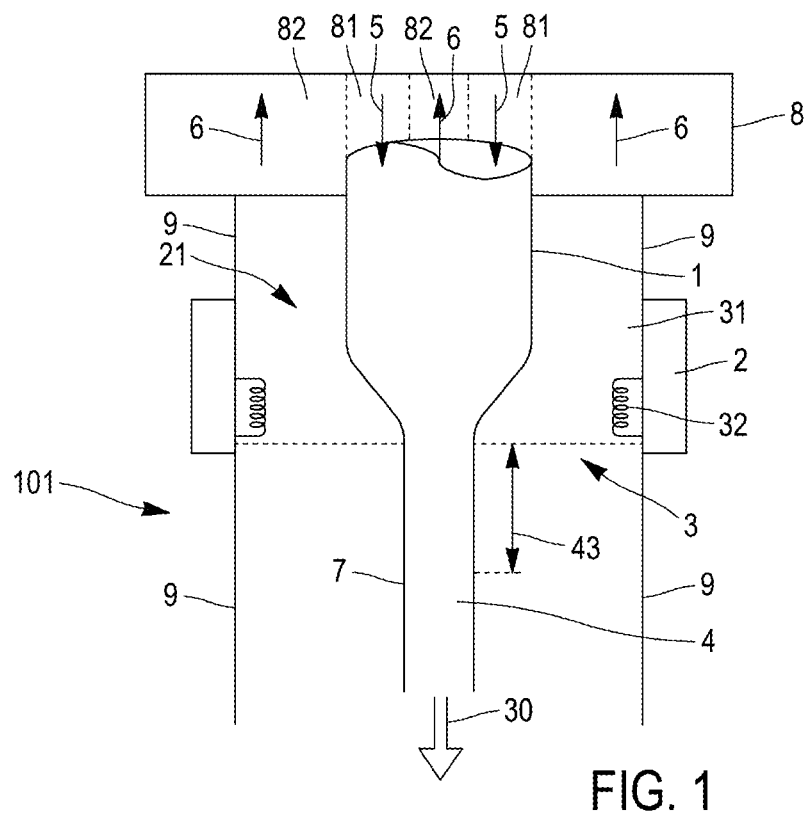
FIG. 1 is a diagrammatic profile view in cross section of a first embodiment of device 101 according to the invention, through which a preform 1 passes.
Figure 2:
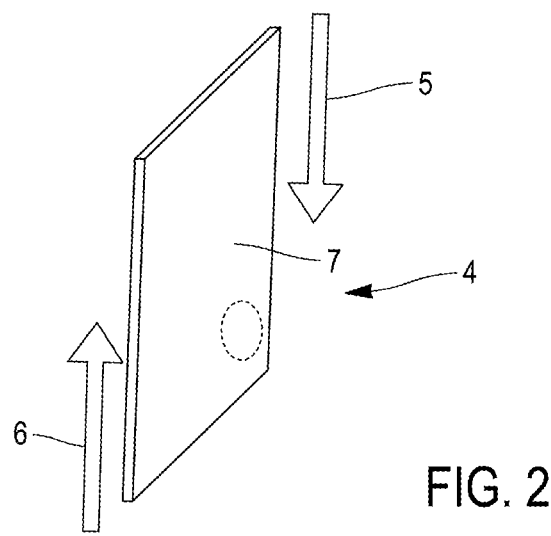
FIG. 2 is an enlargement of a part of a wall 7 of the preform 1.

Firstly, with reference to FIGS. 1 to 6, a first embodiment will be described of the device 101 for manufacturing an optical fibre according to the invention.

The device 101 comprises a furnace 2. The furnace 2 is for example a fibre-drawing industrial furnace from Nextrom.

The furnace 2 comprises an inlet 21 arranged for inserting a preform 1 (typically a glass rod) into the furnace 2. The device 101 also comprises, on the side of the inlet 21, holding means (not shown) arranged to hold a first end of the preform 1 on the side of the inlet 21. These holding means consist for example of a chuck placed on a translation stage.

The device 101 comprises means for drawing the preform 1 via an outlet 3 of the furnace, in a direction of drawing 30. These means (not shown) are located on the side of the outlet 3 of the furnace 2. These means typically comprise two belts facing one another located on the side of the outlet 3 of the furnace 2, where the drawn fibre is placed between the two belts for drawing with an adjustable speed.

The inlet 21 and the outlet 3 are situated at two opposite ends of the furnace 2 in the direction 30.

The device 101 comprises means arranged for subjecting, at least after the outlet 3 of the furnace 2, the two opposite faces of walls 7 composing a structure of a working zone 4 of the drawn preform 1, to gas flows 5, 6 following these walls 7 but in opposite directions so as to subject these walls 7 to a shear force of counter-propagating gas flows on either side of these walls 7.

The flow 5 is a laminar flow along the walls 7 composing the structure of the working zone 4.

The flow 5 is a laminar flow in the entirety of the preform 1.

The flow 6 is a laminar flow along the walls 7 composing the structure of the working zone 4.

The flow 6 is a laminar flow in the entirety of the preform 1.

For each wall 7, on each side of the wall 7 in which the flow 5 or 6 circulates respectively, the ratio between:
  the air (along a cross section perpendicular to the flows 5 and 6) at the inlet 21 of the furnace, of a structure of the preform 1 inside which the flow 5 or 6 circulates respectively, and
  the air (along a cross section perpendicular to the flows 5 and 6) in the working zone 4 (i.e. on the side of the outlet 3 of the furnace 2), of this same structure of the preform 1 inside which the flow 5 or 6 circulates respectively,
is less than 900.

In other words, in the particular case of a structure having a circular cross section, for each wall 7, on each side of the wall 7 in which the flow 5 or 6 circulates respectively, the ratio between:
  the diameter (along a cross section perpendicular to the flows 5 and 6) at the inlet 21, of a structure of the preform 1 inside which the flow 5 or 6 circulates respectively, and
  the diameter (along a cross section perpendicular to the flows 5 and 6) in the working zone 4 of this same structure of the preform 1 inside which the flow 5 or 6 circulates respectively,
is less than 30.

The means arranged for subjecting the drawn preform 1 to gas flows 5, 6 in opposite directions comprise:
  means 81 for creating a gas flow called outlet gas flow 5, propagating from the inlet 21 to the outlet 3 of the furnace 2, and
  means 82 for creating a gas flow called inlet gas flow 6, propagating from the outlet 3 to the inlet 21 of the furnace 2.

The means 81 for creating the outlet flow 5 and the means 82 for creating the inlet flow 6 comprising over-pressure and under-pressure means 8 for creating in the preform 1 on the side of the inlet 21 a pressure difference between the outlet flow 5 and the inlet flow 6, preferably of at least 100 Pa, preferably at least 1 kPa, typically at least 10 kPa.

These means 8 typically comprise a mechanical part with at least two cavities. Each cavity is attached in a sealed fashion by pipes to pressure regulators, which in turn are connected to a gas inlet or to a vacuum pump.

The means 81 for creating the outlet flow 5 and the means 82 for creating the inlet flow 6 are arranged to create the outlet gas flow 5 and/or the inlet gas flow 6 in different distinct zones of the working zone 4.

The means arranged for subjecting the drawn preform 1 to gas flows 5, 6 in opposite directions are situated on the side of the inlet 21 of the furnace 2.

The gas of the gas flows 5, 6 comprises or typically consists of air and/or at least one inert gas from helium, neon, argon, krypton, xenon and radon, and/or a mixture thereof.

The device 101 comprises one or more barriers 9 (comprising for example a metal tube making it possible to enclose and/or to guide a gas flow 5 or 6):
  arranged to surround the preform 1 at the inlet 21 of the furnace 2 and connecting the means 8 to the inlet 21, and arranged to confine at least a portion of the flow 5 and/or 6 on the outer circumference of the preform 1 between the means 8 and the inlet 21, and/or
  arranged to surround the preform 1 at the outlet of the furnace 2 and extending at least from the outlet 3 to the zone 4 inclusive, and arranged to confine at least a portion of the flow 5 and/or 6 on the outer circumference of the preform 1 from the outlet 3 to the zone 4 inclusive.

The working zone 4 is situated outside the furnace 2.

The working zone 4 is situated on the side of the outlet 3 of the furnace 2.

The furnace 2 comprises:
- an enclosure 31 through which the preform passes, and
- a heat source 32 located in the enclosure 31 and arranged to raise the temperature inside the enclosure 31.

The working zone 4 is situated at a distance 43, measured in the direction 30, typically less than 10 cm from the heat source 32.

The furnace 2 is arranged so that the working zone 4 is at a temperature above a softening or vitreous transition temperature of the material composing the preform 1, preferably above 1000° C., preferably above 1500° C.

The vitreous transition temperature is for example:
- 150° C. for chalcogenide GeSbTe,
- 245° C. for chalcogenide AsGeSeTe,
- 235° C. for fluoride glass ZBLAN,
- 280° C. for tellurium dioxide,
- 400° C. for fluoroaluminate,
- 1200° C. for melted quartz.

A first embodiment of the method according to the invention implemented by the device 101 will now be described with reference to FIGS. 1 to 6.

In this embodiment of the method for manufacturing an optical fibre:
- the preform 1 is inserted into the furnace 2,
- the preform 1 is drawn via the outlet 3 of the furnace 2, and
- the preform 1 thus drawn comprising a working zone 4, this zone 4 comprising a structure composed of the walls 7, the two opposite faces of these walls 7 of the zone 4 being subjected (after the outlet 3 of the furnace 2) to the gas flows (5, 6) following these walls 7, these flows 5, 6 being in opposite directions so as to subject these walls 7 to a shear force of counter-propagating gas flows on either side of these walls 7.

The preform 1 is a preform made from glass, for example made from silica.

The preform 1 has the shape of a hollow tube, simple, or preferably with internal structures.

The working zone 4 forms a hollow optical fibre.

The working zone 4 of the drawn preform 1 preferably forms an optical fibre of the micro-structured type, for example of the Kagome type.

The working zone 4 of the drawn preform 1 comprises only walls 7 the thickness of which is less than 10 µm, preferably less than 3 µm, preferably less than 300 nm.

The working zone 4 is situated outside the furnace 2, on the side of the outlet 3.

The working zone 4 is at a temperature above a softening or vitreous transition temperature of the material composing the preform 1, preferably above 1000° C., preferably above 1500° C.

While the preform 1 is inserted through the inlet 21 of the furnace 2, the gas flows 5, 6 following the walls 7 are created by:
- creating the gas flow called outlet gas flow 5, propagating from the inlet 21 to the outlet 3 of the furnace 2, and
- creating the gas flow called inlet gas flow 6, propagating from the outlet 3 to the inlet 21 of the furnace 2.

The gas flows 5, 6 are created by means 8 situated on the side of the inlet 21 of the furnace though which the preform 1 is inserted.

The outlet flow 5 and the inlet flow 6 are created by over-pressure and under-pressure means 8 creating in the preform 1 on the side of the inlet 21 a pressure difference between the outlet flow and the inlet flow, preferably of at least 100 Pa, preferably at least 1 kPa, typically at least 10 kPa.

In the preform 1 of the side of the inlet 21, the pressure of the flow 5 is typically equal to atmospheric pressure plus 5 to 10 kPa and the pressure of the flow 6 is typically equal to atmospheric pressure minus 5 to 10 kPa.

For a preform 1 different from a simple tube but having different internal structures allowing the manufacture of a micro-structured optical fibre, the outlet gas flow 5 and/or the inlet gas flow 6 is created in different distinct zones of the working zone 4.

According to the variant in question, the working zone 4 of the drawn preform 1 can for example comprise:
- with reference to FIG. 3, the walls 7 that form:
  - a hollow core in which the flow 6 or 5 circulates respectively
  - hollow cylinders or tubes surrounding the hollow core, in each of which the flow 5 or 6 circulates respectively
  - a wall surrounding the hollow core and the cylinders or tubes, on the outer circumference of which the flow 6 or 5 circulates respectively
- with reference to FIG. 5, the walls 7 forming an alveolar structure comprise alveolae (for example hexagonal) in each of which the flow 5 or 6 circulates respectively, and hollows or space separating these alveolae in each of which the flow 6 or 5 circulates respectively (shown in shaded in FIG. 5b with respect to FIG. 5a).
- with reference to FIG. 6, the walls 7 (left wall, right wall, front wall, rear wall of the preform 1) are amalgamated in the form of a simple hollow tube or cylinder inside which the flow 6 or 5 circulates respectively and outside which the flow 5 or 6 circulates respectively.

The invention makes it possible to reduce the amplitude of the surface roughness of a surface intercalated between two shear stress forces having opposite directions.

The invention makes it possible, for hollow-core micro-structured fibres, to limit the surface roughness due to a hydrodynamic phenomenon during drawing of the fibre, and which induces losses by light dispersion and thus a limit on the transmission performance of the optical fibres.

During the manufacture of the optical fibre, the preform 1 is inserted into the furnace 2 and heated to a temperature such that the glass undergoes a phase transition and becomes viscoelastic. This "liquid" glass is then drawn into optical fibre. During this liquid phase, the glass is the site of a mass or density fluctuation that can be presented as a stochastic composition of phonon waves. During this drawing the glass undergoes a second phase transition, passing from the liquid to the solid phase, and the fluctuations mentioned above are "frozen". In the case of hollow fibres (hollow-core guiding optical fibre), the frozen fluctuations result from surface waves, called capillary waves, and adopt the form of a surface roughness shown in FIG. 4b, absent implementation of the method according to the invention, i.e. without the flows 5, 6. This roughness thus induces a light dispersion the amplitude of which is proportional to the ratio of coverage of the light in the core with the glass contour and to the amplitude of surface roughness. Today, this dispersion is a limit of the state of the art of the hollow fibres.

On the other hand, after implementation of this method according to the invention, as shown in FIG. 4a there is a reduction in the surface roughness by controlling the capillary waves by a counter-propagating shear stress force.

Research has shown that for the hollow fibres guiding by inhibited coupling, of the Kagome or tubular type, the losses can be as low as $10^{-2}$ to $10^{-3}$ dB/km in the spectral range of the visible to UV if the surface roughness is significantly reduced.

The invention thus addresses a fundamental problem for hollow-core optical fibre.

In a particular example:
- the preform is made from hollow-core silica with a micro-structured cladding of the Kagome type and has, at the inlet 21, an outside diameter of 40 mm
- the enclosure of the furnace 2 is heated to 1900° C.
- the working zone 4 is at a temperature of approximately 300° C. to 1000° C.
- the preform 1 is drawn, from the side of the outlet 3, at a speed of 15 m/min
- the flow 5 is an argon flow and at a pressure, in the preform 1 on the side of the inlet 21, of 30 kPa above atmospheric pressure,
- the outlet flow 6 is at a pressure, in the preform 1 on the side of the inlet 21, of 6 kPa below atmospheric pressure.

The optical fibre obtained has an excellent transmission loss of approximately 1-2 dB/km at 600-800 nm.

The invention makes it possible to obtain a hollow fibre with losses lower than the current state of the art, and will consolidate its applications in sectors such as:

1. Laser micromachining: The fibre obtained according to the present invention allows flexible and safe routing of a high-flux laser beam.
2. Laser pulse compression: The fibre obtained according to the present invention makes it possible to compress laser pulses by a simple optimization of the fibre length and the choice of the gas to be introduced into the core of the fibre.
3. Surgery: The fibre obtained according to the present invention allows flexible and safe routing of a laser beam for endoscope or Lasik-type operations.
4. Cell treatment: The fibre obtained according to the present invention allows flexible and safe routing of an ultra-short laser beam for the targeted destruction of cancer cells without depositing heat.
5. Gas laser: The fibre obtained according to the present invention the core of which is filled with an active gas allows it to be used as a laser cladding medium.
6. Frequency standard: The fibre obtained according to the present invention the core of which is filled with a gas (e.g. acetylene, Rb or Cs vapour) allows it to be used as a frequency standard.
7. THz imaging: The THz guide obtained according to the present invention allows flexible and safe routing of THz radiation, and THz radiation collection for imaging.
8. Waveguide for THz and microwave: The guide obtained according to the present invention allows single-mode THz and/or microwave guiding with low transmission losses.
9. Low latency telecommunication in data centres.

Of course, the invention is not limited to the examples that have just been described, and numerous modifications may be made to these examples without exceeding the scope of the invention.

Of course, the various characteristics, forms, variants and embodiments of the invention can be combined together in various combinations inasmuch as they are not incompatible or mutually exclusive. In particular, all the variants and embodiments described above can be combined together.

The invention claimed is:

1. A method for manufacturing an optical fibre, comprising:
    inserting a preform into a furnace, the furnace having an inlet and an outlet, the preform being inserted into the furnace inlet;
    drawing the preform in a direction from the furnace inlet to the furnace outlet; and
    for a working zone of the preform comprising a structure having walls, individually subjecting two opposite faces of each one of the walls of the working zone to laminar gas flows along the walls in opposite directions to subject the walls to a shear force produced by the oppositely-flowing laminar gas flows on either side of the walls,
    wherein the working zone subjected to laminar flows is, at the same time:
    located outside the furnace on a side of the furnace outlet where the preform has a smaller cross-section compared to the cross-section of the preform at the furnace inlet, and
    at a temperature above a softening or vitreous transition temperature of a material of the preform.

2. The method according to claim 1, characterized in that the walls have a thickness less than 10 μm.

3. The method according to claim 1, characterized in that the preform is inserted through an inlet of the furnace, the gas flows following the walls being created by:
    creating a gas flow called outlet gas flow, propagating from the inlet to the outlet of the furnace; and
    creating a gas flow called inlet gas flow, propagating from the outlet to the inlet of the furnace.

4. The method according to claim 3, characterized in that the outlet gas flow and the inlet gas flow are created by over-pressure and under-pressure means by creating in the preform on a side of the inlet, a pressure difference between an outlet gas flow pressure and an inlet gas flow pressure.

5. The method according to claim 4, wherein the pressure difference, in the preform on the side of the furnace inlet between the outlet gas flow pressure and the inlet gas flow pressure is at least 100 Pa.

6. The method according to claim 3, characterized in that the outlet gas flow and/or the inlet gas flow is created in different distinct zones of the working zone.

7. The method according to claim 1, characterized in that the gas flows are created by means situated on the side of an inlet of the furnace through which the preform is inserted.

8. The method according to claim 1, characterized in that the gas of the gas flows comprises one or more of air or an inert gas.

9. The method according to claim 1, characterized in that the working zone forms a hollow optical fibre.

10. The method according to claim 9, characterized in that the working zone forms an optical fibre of a micro-structured type.

11. The method according to claim 1, characterized in that the preform is a glass preform.

12. The method according to claim 1, wherein the operating temperature of the working zone is above 1000° C.

13. A device for manufacturing an optical fibre, comprising:
    a furnace having an inlet and an outlet,
    the inlet being arranged for inserting a preform in the furnace;
    means for drawing the preform in a direction from the inlet to the outlet of the furnace; and for a working zone of the preform comprising a structure having walls, means configured to and arranged for subjecting the two opposite faces of each wall of the working zone to laminar gas flows following said walls but in opposite directions to subject said walls to a shear force produced by counter-propagating gas flows on either side of said walls, such that the working zone subjected to laminar flows is, at the same time:

located outside the furnace on the side of the outlet of the furnace where the preform has a smaller cross-section compared to the cross-section of the preform at the input of the furnace, and at a temperature above a softening or vitreous transition temperature of a material of the preform.

* * * * *